United States Patent [19]

Cissell II

[11] Patent Number: 5,027,508
[45] Date of Patent: Jul. 2, 1991

[54] METHOD OF MANUFACTURING AN ALUMINUM WHEEL

[76] Inventor: James K. Cissell II, 6958 Pebble Park Cir., West Bloomfield, Mich. 48233

[21] Appl. No.: 413,872

[22] Filed: Sep. 29, 1989

[51] Int. Cl.[5] ............................................. B21H 1/02
[52] U.S. Cl. .......................... 29/894.322; 29/894.354; 29/412; 301/63 DD
[58] Field of Search ............. 29/159.01, 159.1, 159 R, 29/412, 414, 415, 447, 894.32, 894.322, 894.35, 894.351, 894.352, 894.353, 894.354; 301/63 DD, 65, 63 R

[56] References Cited

U.S. PATENT DOCUMENTS

| | | | |
|---|---|---|---|
| 1,691,491 | 11/1928 | Nelson | 29/894.354 |
| 2,068,947 | 1/1937 | Frank | 29/159.1 |
| 2,105,317 | 1/1938 | Frank | 301/65 |
| 3,611,535 | 6/1968 | Nobach | 29/159.01 |
| 3,874,736 | 4/1975 | Anderson et al. | 301/63 R |
| 4,074,407 | 2/1978 | Christensen | 29/447 |

FOREIGN PATENT DOCUMENTS

| | | | |
|---|---|---|---|
| 86038 | 5/1986 | Japan | 29/159.1 |
| 40628 | 2/1988 | Japan | 29/159.1 |

*Primary Examiner*—P. W. Echols
*Attorney, Agent, or Firm*—Dykema Gossett

[57] ABSTRACT

An improved aluminum wheel is disclosed having a two-part construction with a disc at a front position and a rim extending to a rear position. The disc comprises all the portions of the wheel that are visible from the front and thus is the only portion that is chrome-plated. The rim is formed from a double rim member that is cut at a central position to form two rims. Substantial savings in machinery, manufacturing, and material costs are realized by this arrangement.

3 Claims, 3 Drawing Sheets

METHOD OF MANUFACTURING AN ALUMINUM WHEEL

BACKGROUND OF THE INVENTION

This invention in general relates to an improved wheel and more particularly to an improved aluminum wheel that results in various manufacturing cost savings.

In the prior art, tires are generally mounted on one-piece wheel members that comprised both a rim and a front disc for the wheel. These one-piece members were often heavy and expensive to manufacture. In many of these prior art wheels, the entire one-piece member was chrome-plated, since it is difficult to chrome-plate a selected area of a one-piece member. Chrome-plating is a relatively expensive process and it is undesirable that portions of the wheel that are to be hidden from view by a tire be chrome-plated.

There are prior art two-piece aluminum wheels, however, in these wheels the rim usually extends to the front position of the wheel and thus requires some chrome-plating.

In addition, the manufacturing of wheels requires complicated rolling machinery in order to form the rim and disc members that the tires are to be mounted upon. Such member require various undulations at locations set to standard SAE specifications.

This situation is further complicated by the fact that wheels are manufactured to various diameters, and each diameter is available in various widths. Each different diameter of wheel, and each width, requires a separate rolling machine station. Thus, the startup costs for manufacturing wheels is quite high.

It is an object of the present invention to make a lightweight, inexpensive aluminum wheel in which only the visible portions are chrome-plated and which requires relatively few rolling machine stations in order to be able to provide wheels for the various diameters and widths of standard wheels.

SUMMARY OF THE INVENTION

The present invention discloses an improved wheel having aluminum disc and rim members with the disc defining the front position of the wheel and including all of the visible portions of the wheel, once the tire is mounted upon it. Thus, only the disc must be chrome-plated. The disc is a relatively small portion of the entire surface area of the wheel and thus substantially reduces the chrome-plating cost over the prior art in which the entire disc and rim was often chrome-plated.

The present invention further discloses a rim formed from a double rim member which is rolled at a first rolling station. This double rim member is essentially a symmetrical member consisting of two separate rims for the improved wheel. A central portion of the double rim member is defined as a double well portion and extends for a set width. The double well is cut at selected points in order to form two rims for use in the improved wheels. The selected points are determined from the width of the final that is desired. Only a single rolling station is required for each diameter of wheel and the various widths for any particular diameter of wheel can be achieved by cutting the double well at a selected point.

In one embodiment of the invention, the disc extends from a front position of the wheel and has a cylindrical extension extending towards a rear position of the wheel. The cylindrical extension is received within a cylindrical well of the rim that extends rearwardly to the rear position of the wheel. A tire having two sealing beads is received upon the disc and rim with a first sealing bead received at a sealing bead seat on the disc and the second sealing bead seat being received on a sealing bead seat on the rim. The rim and disc are welded together to form an airtight unit.

The improved wheel is thus made in approximately half the time, requires approximately half the machining steps, and requires much less machinery than used in the prior art.

These and other objects of the present invention can be best understood from the following specification and drawings, of which the following is a brief description.

DETAILED DESCRIPTION OF A PREFERRED EMBODIMENT

Figure 1:
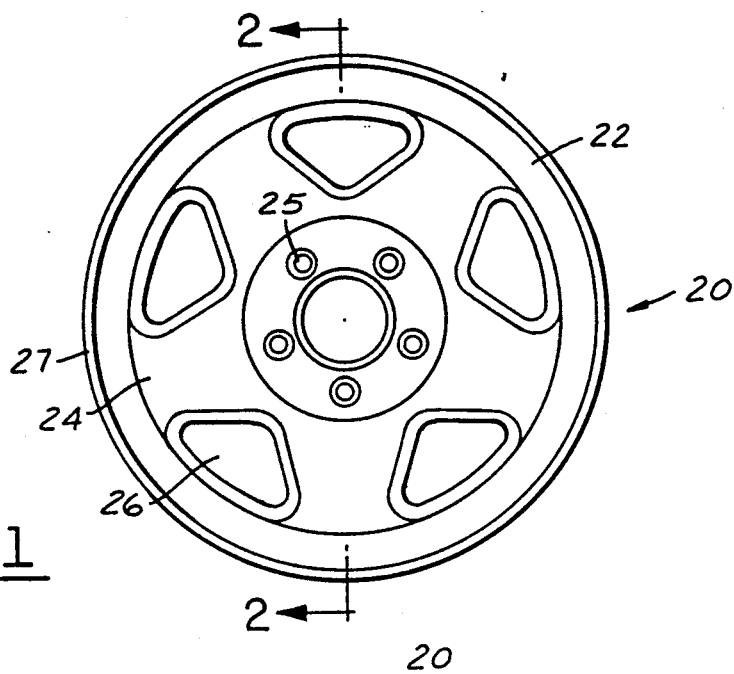
FIG. 1 is a front view of a disc as disclosed by the present invention.
Figure 2:
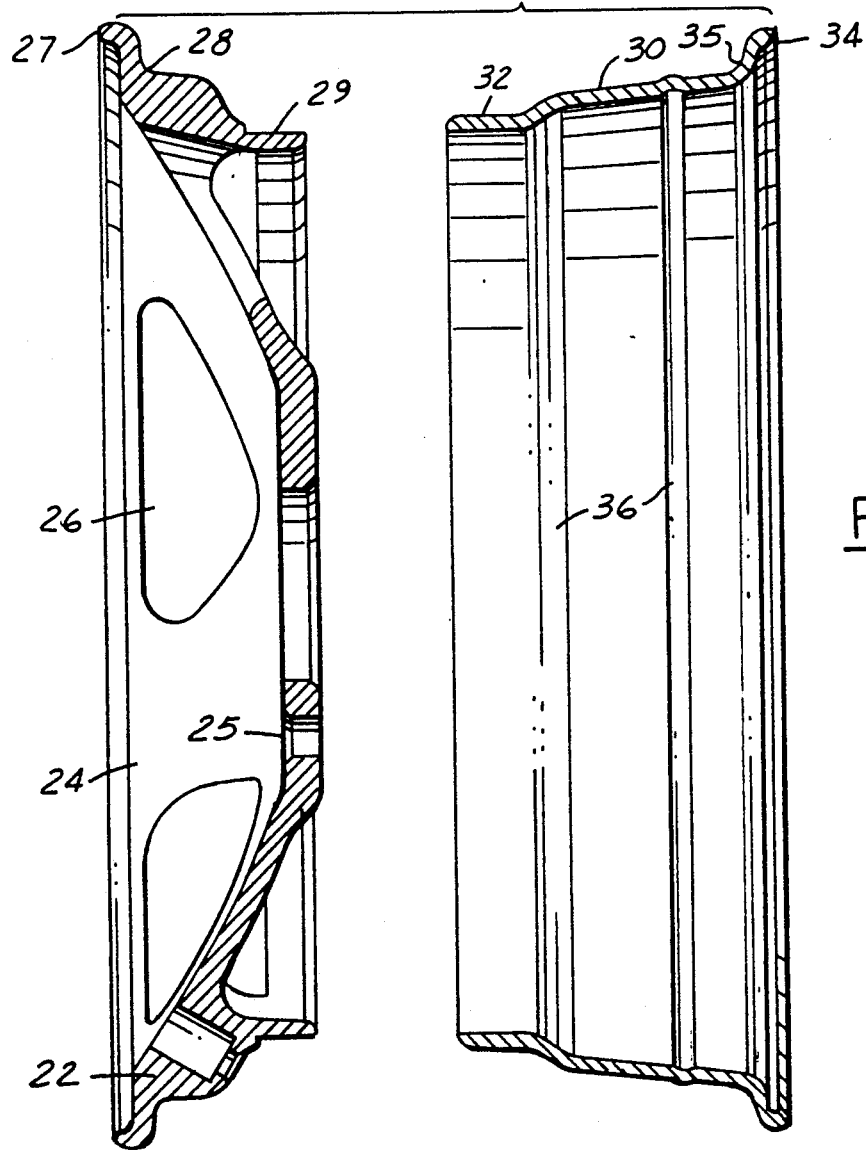
FIG. 2 is an assembly view showing a disc and rim according to the present invention.
Figure 3:
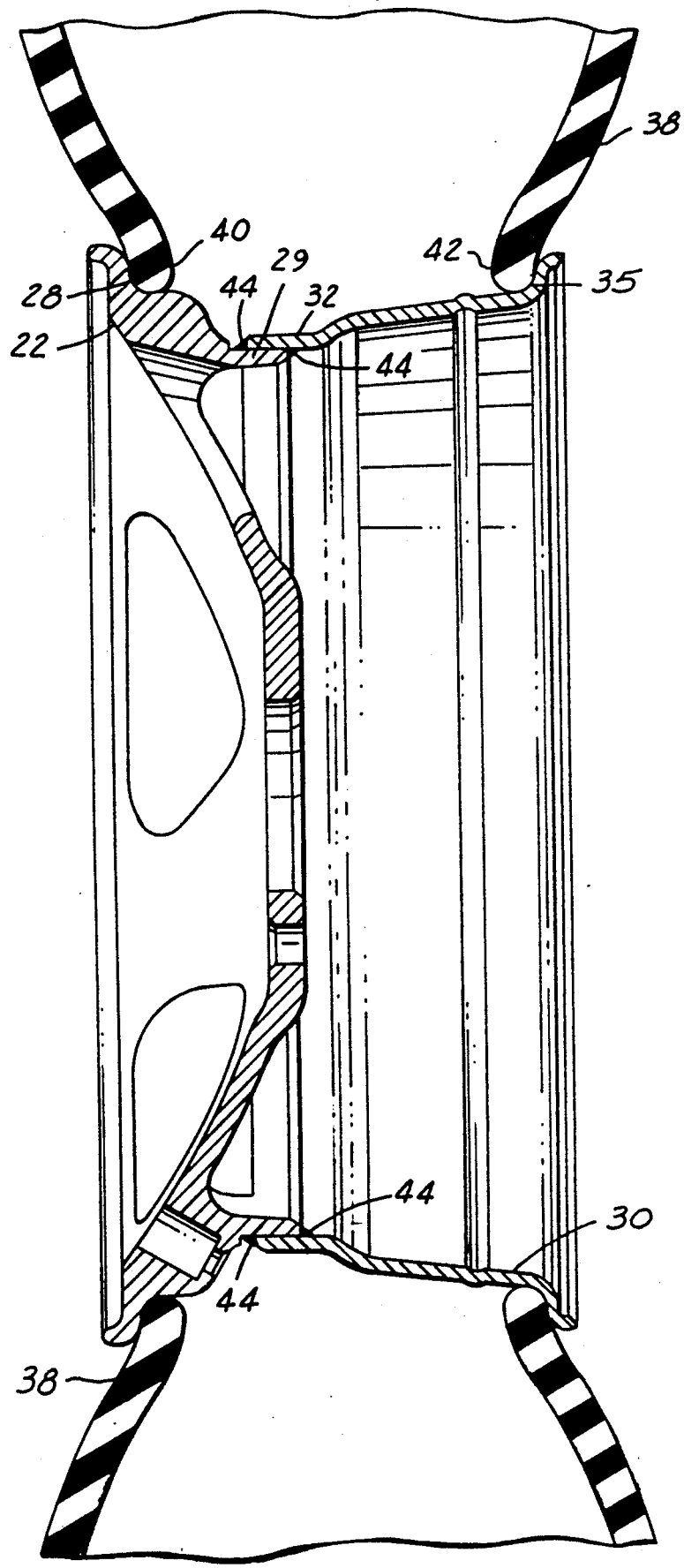
FIG. 3 is a cross-sectional view through an improved wheel according to the present invention.

A preferred embodiment of a wheel according to the present invention can be best understood from FIGS. 1 through 3. As shown in FIG. 1, wheel 20 consists of disc body 22 having face 24 and bolt receiving holes 25 for mounting wheel 20 upon an axle, not shown. Openings 26 are formed within face 24 to reduce the weight of wheel 20 and also as design features. The disc outer periphery 27 defines a front position of wheel 20.

As shown in FIG. 2, disc 22 has sealing bead seat 28 at a forward position and a cylindrical extension 29 extending towards a rear position. Cylindrical extension 29 is of a diameter smaller than the diameter of sealing bead seat 28.

A rim body 30 includes a cylindrical well 32 extending forwardly towards the front position of wheel 20. A rear position of rim 30 is defined by outer periphery 34 and sealing bead seat 35 is near this rear position. Various undulations 36 are formed within rim 30 and may be set to standard SAE specifications.

As shown in FIG. 3, tire 38 is mounted upon disc 22 and rim 30 with first sealing bead 40 received at sealing bead seat 28 and second sealing bead 42 received at sealing bead seat 35. Cylindrical extension 29 is received within cylindrical well 32 and is welded at weld joints 44. Two weld joints 44 may be utilized, or, optionally only one may be used in order to achieve an airtight seal. Cylindrical well 32 is radially smaller than sealing bead seat 35 to receive sealing bead 42 for facilitating mounting of tire 38.

It is to be understood that the distance between sealing bead seats 35 and 28 define the width of wheel 20. Thus, the distance that cylindrical well 32 extends will directly control the width of the wheel 20. That is, if cylindrical well 32 is relatively long, the width of the wheel 20 will also be greater. However, if cylindrical well 32 is selected to be relatively short, the width of the tire will be correspondingly short.

A method for assembling wheel 20 will now be described. Disc 22 is preferably formed of a one-piece aluminum casting which is machine finished. Disc 22 is then chrome-plated.

Figure 5:
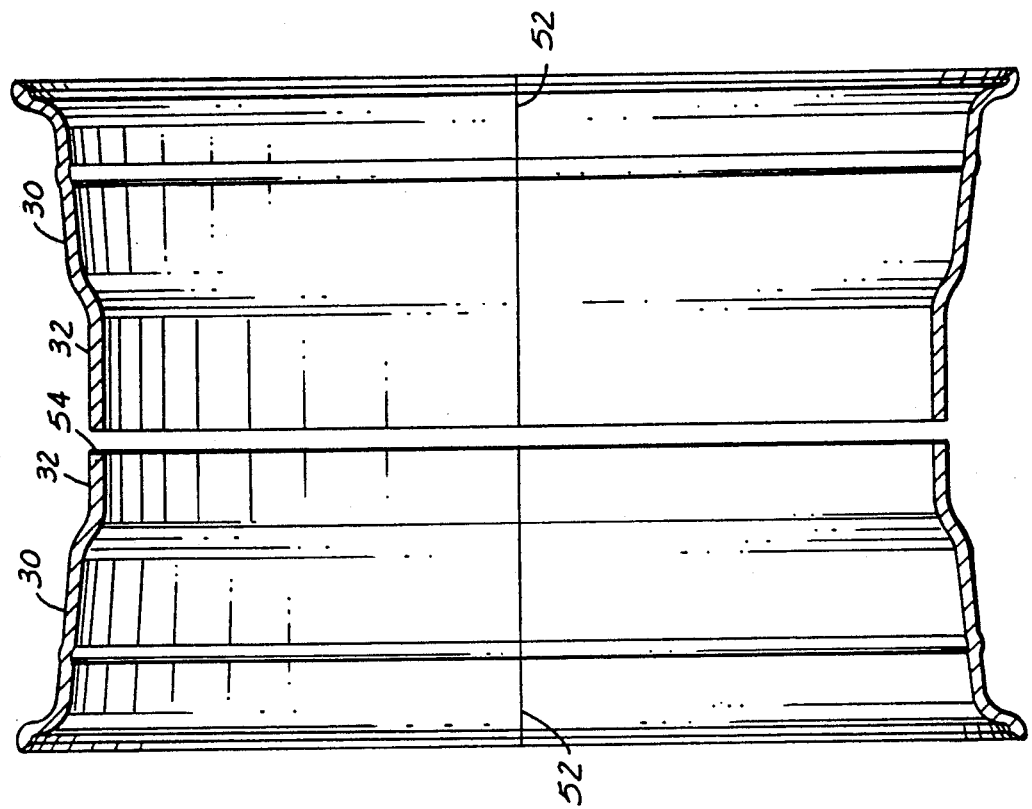
FIG. 5 is a view similar to FIG. 4 but showing the double rim member cut into two separate rims.
Figure 4:
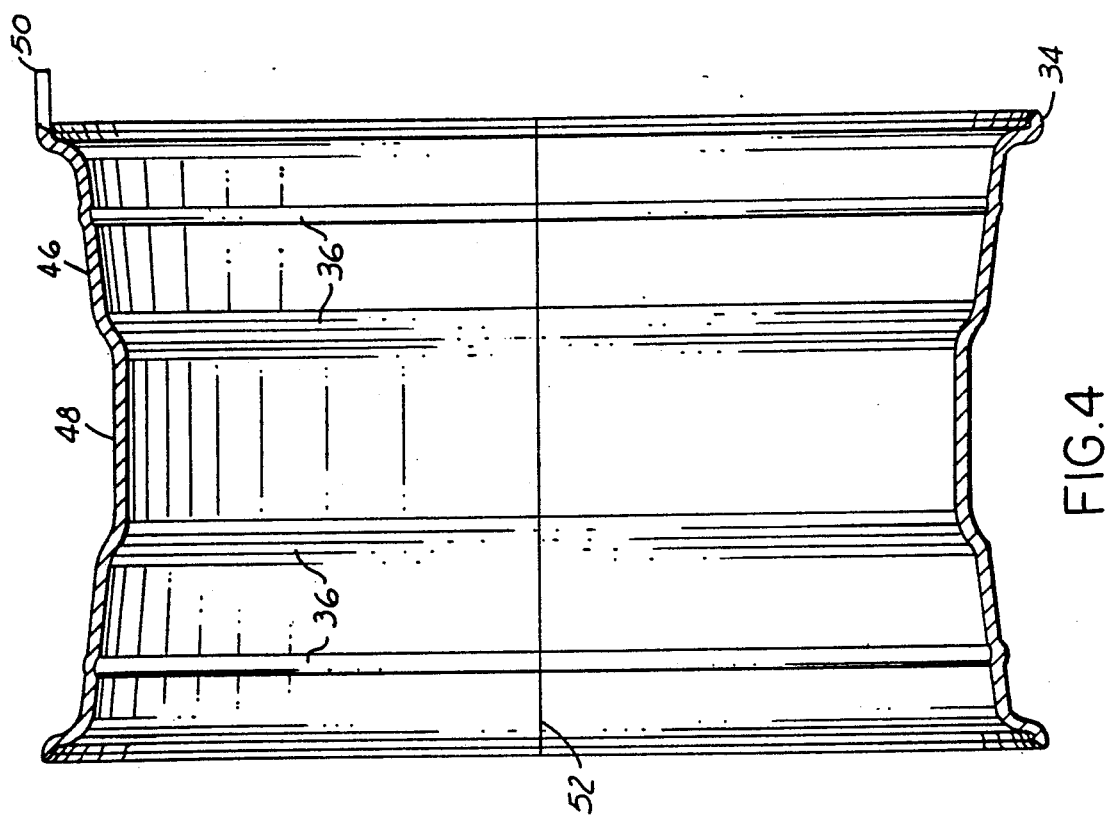
FIG. 4 is a cross-sectional view through a double rim member according to the present invention.

The steps in forming rim 30 can be understood from FIGS. 4 and 5. Rim 30 is formed from a flat strip of aluminum that is cut in length to conform to the specific diameter of the final wheel. The width of the flat strip of aluminum will vary depending on the various widths used with that particular rim diameter. The width is preferably selected to accommodate the largest width typically used with the selected diameter. The flat strip of aluminum is rolled into a cylinder and butt-welded, preferably by electric current welding, across joint 52.

At this point, the cylindrical aluminum member is put into an expander die that reduces the diameter of a central portion, thus resulting in the general shape of the final double rim member 46. The cylindrical member then enters a series of rolling dies at a rolling station, or a roll-forming machine, upon which the various undulations 36 and double well 48 are formed on double rim member 46. These stations may typically have two to four dies.

The member leaving the rolling station is illustrated in FIG. 4 and is defined as a double rim member 46 having a double well 48. Extensions 50 may be trimmed off to form outer periphery 34 of final rims 30. Joint 52 extends across the length of double rim member 46.

Double rim member 46 is then cut at a point within double well 48 that is selected to achieve a desired final width for wheel 20. As shown in FIG. 5, the cut 54 results in two members, each of which may be utilized as a rim 30. If two smaller width rims 30 are desired, it may be necessary to perform a second cut 54 to remove excess material from the well 32 of one of the two rims 30.

To determine the selected points, one calculates the desired distance of the final cylindrical well 32 to arrive at a desired distance between sealing bead seats 35 and 28. In doing this, the length of cylindrical extension 29 must be considered. Also, it is important that cylindrical extension 29 is fully received in cylindrical well 32 to ensure accuracy of the width of wheel 20. Then, when double rim member 46 is cut, it is cut 54 at a position to arrive at this desired cylindrical well size.

A trim die is used to make cuts 54 and the rims 30 are checked for uniformity and air leaks.

Disc 22 is attached to rim 30 by first heating rim 30 to expand it. Disc 22 is then placed with cylindrical extension 29 received within cylindrical well 32 and rim 30 is allowed to cool. It is important that cylindrical extension 29 be fully received within cylindrical well 32. Next, weld joints 44 are formed, either at the inside or outside of wheel 20, or both. Weld joints 44 may be formed by electric welding, and, preferably by electron beam welding.

Later, and usually at another location, tire 38 is mounted on rim 30 and disc 22, with sealing bead 40 received on sealing bead seat 28 and sealing bead 42 received on sealing bead seat 35.

With improved wheel 20, fewer rolling stations are required to manufacture all diameters and widths of wheels. A single rolling station is necessary for any diameter wheel, however, any width may be formed from the single rolling station. By making double well 48 of sufficient length, any final width may be manufactured.

As an example, fifteen inch diameter wheels are typically six, seven or eight inches wide. By forming double rim member 56 of sufficient length such that cut 54 results in a cylindrical well 32 sufficient to form an eight inch wheel, and perhaps at the same time a six inch wheel, any width of wheel may be formed by a single rolling station. In addition, there would be no waste of material if the eight inch and six inch rims are formed, or if two seven inch rims are formed.

Fourteen inch diameter wheels are typically five or six inches wide. A single rolling station can form both these widths, as explained above.

The SAE specifications for standard rims do not change drastically over time, and thus, the rolling stations need not be frequently replaced.

Thus, a wheel has been disclosed that results in cost savings, both from the requirement of less machinery, less material, and also the requirement of less chrome-plating costs. In addition, the improved wheel is formed of aluminum and is thus relatively lightweight.

An embodiment of the present invention has been disclosed, however, those skilled in the art would realize that certain modifications would be within the scope of this invention and thus reference should be had to the following claims in order to determine the true scope and content of the present invention.

I claim:

1. A method of assembling a wheel comprising the steps of:
   (1) forming a double rim member having a sealing bead seat at both axial ends and a double well portion at a center position; and
   (2) cutting the double well portion of said double rim member at a selected point on the double well portion to arrive at a pair of rims each having a cylindrical well portion of a desired width, the desired width being measured from the sealing bead seat;
   (3) mounting a disc to each of the pair of rims, the discs each having a cylindrical extension, by inserting the cylindrical extension into the cylindrical well portion on the rims; and
   (4) mounting a tire having two sealing bead seats over each disc and rim, there being one sealing bead seat on the disc and one sealing bead seat on the rim.

2. A method as recited in claim 1, wherein the tire covers the rim such that only the disc can be seen from the front of the wheel.

3. A method as recited in claim 2, wherein the disc is chrome-plated.

* * * * *